United States Patent [19]
Lewis

[11] 3,823,981
[45] July 16, 1974

[54] SITU LEACHING SOLVENT EXTRACTION-PROCESS
[75] Inventor: Arthur E. Lewis, Los Altos, Calif.
[73] Assignee: The United States of America as represented by the United States Atomic Energy Commission, Washington, D.C.
[22] Filed: Apr. 4, 1973
[21] Appl. No.: 347,757

[52] U.S. Cl. .................................. 299/4, 166/247
[51] Int. Cl. .......................................... E21b 43/28
[58] Field of Search .................................. 299/4, 5

[56] References Cited
UNITED STATES PATENTS
2,161,800  6/1939  Cross .................................. 299/4 X
3,640,579  2/1972  Lewis .................................... 299/4

OTHER PUBLICATIONS
Rawling, "Commercial Solvent Extraction Plant Recovers Copper From Leach Liquors," World Mining, December, 1969, pp. 30–33.

Primary Examiner—Ernest R. Purser
Attorney, Agent, or Firm—John A. Horan; F. A. Robertson; Irene S. Croft

[57] ABSTRACT

A nuclear explosive is detonated in an ore deposit below the water table to provide fragmented ore disposed in a nuclear chimney which serves as an in situ pressure vessel. The vessel is filled with water from external sources or by flow from the formation and oxidizing gas is bubbled through the ore to oxidize and dissolve metal values therein. An organic extractant solution is then contacted with the aqueous phase in the vessel and is circulated to the surface where the metal values are recovered therefrom. Following makeup the organic phase is recycled into the nuclear chimney.

9 Claims, 1 Drawing Figure

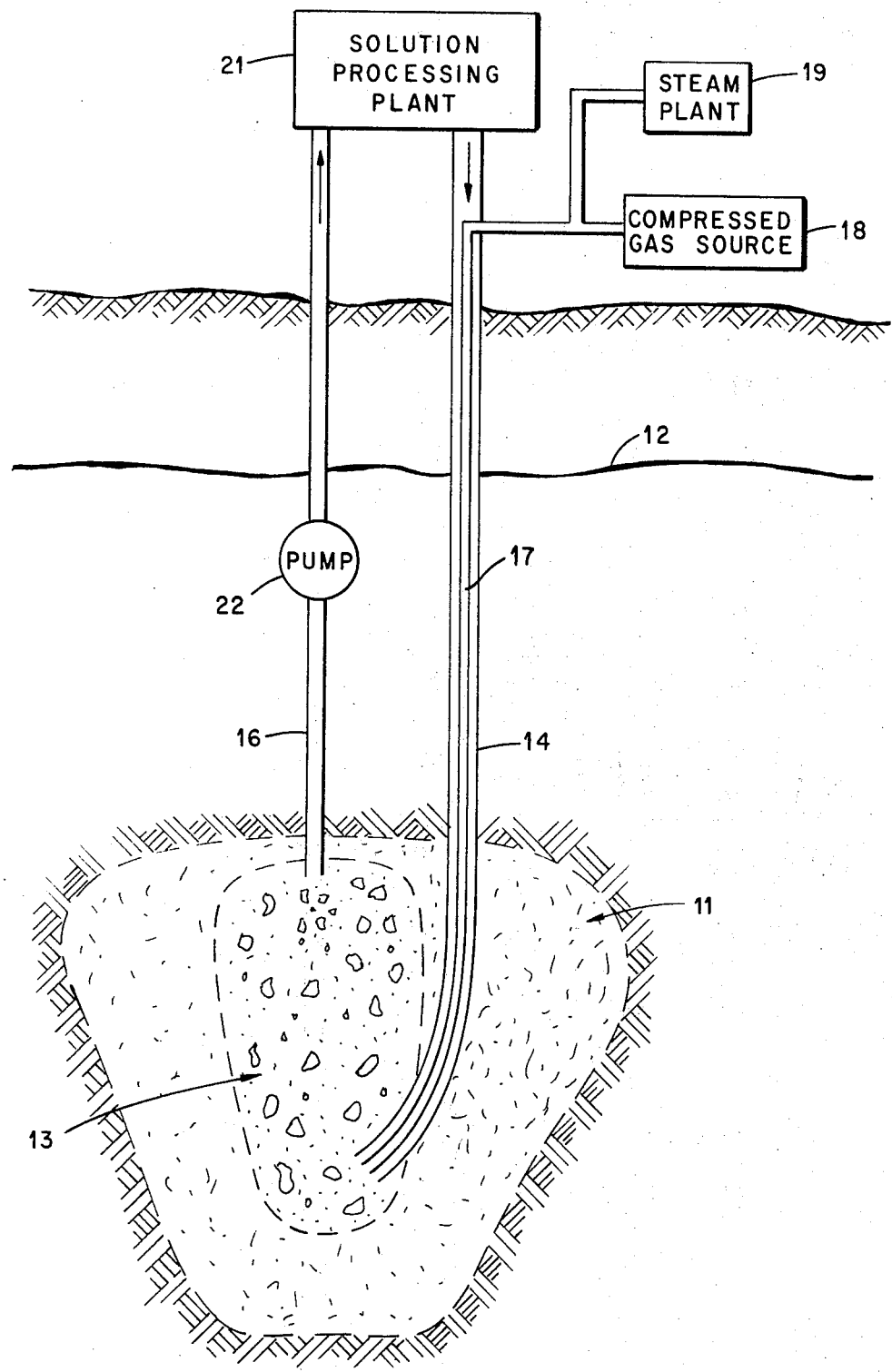

SITU LEACHING SOLVENT EXTRACTION-PROCESS

BACKGROUND OF THE INVENTION

The invention disclosed herein was made in the course of or under Contract W-7405-ENG-48 with the United States Atomic Energy Commission.

Large ore deposits, particularly copper ore deposits, typically have a relatively shallow oxidized secondary ore zone above the water table and a much deeper unoxidized primary ore zone below the water table. Many of such primary deposits have been upgraded by processes of oxidation and supergene enrichment to concentrations that make them economically feasible to mine. The enrichment process is a near-surface process. Most ore deposits have been developed by mining the enriched and oxidized zone thereof. Only where the primary ore is rich enough has it been economical to mine at depth or, with large and efficient earth-moving equipment, to mine large deposits in open-pit mines. Leaching techniques have been applied economically to the oxidized parts of ore deposits or to those that can be oxidized by alternate solution and weathering or bacterial oxidation, generally by vat, heap or dump leaching procedures applied to waste or low grade material which has been excavated to the surface, or is disposed in abandoned mine workings, block caving areas, etc. Because of low permeability leaching procedures generally cannot be applied to undisturbed ore bodies. Historically, copper has been recovered from leach solutions by the cementation process. However, in recent years the copper has also been recovered by extraction with liquid ion exchange or solvent extraction techniques using reagents such as LIX-64 a product of General Food Corporation and Kelex-100 of the Ashland Chemical Company (c.f. pages 254, 255 of Supplementary Volume (1971) of The Encyclopedia of Chemical Technology, Second Edition). Primary ores, e.g., sulfides such as chalcopyrite of a sufficiently high grade are generally processed by sulfide concentration, e.g., flotation, roasting, acid treatment and electrolysis. However, large deposits of such ores remain undeveloped because they lie too deep to mine economically, their size is too small to allow the economics of large-scale mining operations, the grade is too low, or various combinations of these factors. Reserves of copper and other elements would be considerably increased if an economical process of obtaining such elements from deep primary ore deposits were available.

With a view towards economic recovery of elements from deep ore deposits, various nuclear explosive mining methods have been heretofore proposed. In this regard, it has been contemplated to employ a contained nuclear explosion to break up a deep ore deposit and form a rubble chimney therein. A leach solution is then percolated through the chimney to oxidize the broken ore and cause the desired element to go into solution. The solution is pumped to the surface and the desired element recovered therefrom by conventional processes. However, it has been found that at the low pressures, such as atmospheric pressure, various ores, e.g., chalcopyrite and most other primary sulfide minerals, are not effectively dissolved by the leach solution, or the rate of solution is so slow that any such process is impractical. It is known that the oxidation process and rate of solution are accelerated by the addition of an oxidizing agent, such as oxygen, chlorine, ferric sulfate, or the like, to the solution and ore. However, many of such agents are too expensive or corrosive to use. Moreover, although oxygen is relatively inexpensive and non-corrosive, it is not very soluble in a leach solution and otherwise reacts only very slowly with ore minerals at atmospheric pressure.

However, as disclosed in my U.S. Pat. No. 3,640,579 issued Feb. 8, 1972, relating to an in situ leaching procedure, the rate of oxidation is dramatically increased using oxidizing gases at the elevated hydrostatic pressures occurring at depth below the water table in buried deposits and at somewhat elevated temperatures caused by the exothermic oxidation process and by heating of a leach solution which is recirculated to the surface. While such procedure is advantageous in several respects, other improved in situ leaching procedures may provide additional advantages.

SUMMARY OF THE INVENTION

The present invention relates to the economic recovery of valuable elements from their primary ores, and is more particularly directed to in situ leaching of primary ore using aqueous solutions under pressure and wherein the desired values are recovered from the leaching solution, in situ, by contact with an organic extractant.

In operating the process of the present invention, well known nuclear technology is employed to form a rubble chimney by underground nuclear detonation in a subterranean ore deposit to serve as an in situ leaching reaction vessel. Generally, according to the present invention it is preferred to provide and utilize a flooded nuclear chimney formed beneath the water table which provides an environment uniquely beneficial to the economic mining of the ore. More particularly, in accordance with the method of the present invention a contained nuclear explosive is detonated in a primary ore deposit well below the water table to provide a mass of fragmented ore in a flooded chimney subjected to substantial hydrostatic pressure, the chimney thereby serving as an in situ pressure vessel suitable for pressure leaching of the ore. The hydrostatic pressure increases the solubility of an oxidizing gas introduced into the chimney sufficiently to allow the primary ore compounds to be oxidized and dissolved into the leach solution in a relatively short time, such leach solution usually being formed by the aforesaid oxidizing reaction. Similar in situ pressure leaching cavities or vessels suitable for practice of the invention may be created by block caving, hydrostatic fracturing, by using conventional explosives or by other methods.

Thereafter, as a salient feature of the invention, an organic extractant phase is contacted with the leach solution in the nuclear chimney pressure vessel to extract the mineral values therefrom. Usually the extractant phase is introduced proximate the bottom of said chimney to disperse and rise upwardly through the leach solution and fragmented rock to collect at the top of the chimney. The loaded extract solution is withdrawn therefrom to a surface processing plant which can be of a design similar to those used to treat similar type extractant phases as employed in conventional leaching systems. Certain advantages such as the necessity of circulating lesser volumes of fluids, more selective extraction, and others are obtainable.

BRIEF DESCRIPTION OF THE DRAWING

The invention is illustrated in the accompanying drawing wherein the single FIGURE is a cross section of a geological formation with a nuclear chimney formed in a primary ore deposit and adapted to the conduct of a solvent extraction-leaching method in accordance with the present invention.

DETAILED DESCRIPTION OF THE INVENTION

Referring now to the drawing in detail, there is shown a primary ore deposit 11 which includes compounds of a valuable element which is desired to be obtained. Certain of the procedural operations and condition may be generally similar to or in a modified form of those disclosed in my aforesaid U.S. Pat. No. 3,640,579. For example, in the case of copper the ore may comprise primary copper sulfides such as chalcopyrite, bornite, chalcocite, etc. In accordance with the particularly salient aspects of the present invention, such a deposit 11 is first located which exists well beneath the water table 12. Thereafter, a nuclear chimney 13 of broken ore is formed in the deposit entirely beneath the water table, preferably at a substantial depth thereunder. Formation of the chimney is accomplished in general accordance with well established nuclear technology by emplacing and detonating a nuclear explosive having a predetermined yield, at a predetermined depth commensurate with a contained explosion in the ore deposit productive of a rubble chimney of broken ore having a predetermined height above the detonation point selected to not exceed the water table 12. It is particularly important to note that although fracturing into a water bearing formation is usually to be avoided in the detonation of some contained underground nuclear explosions in order to prevent flooding of the resulting rubble chimney, in accordance with the present mining method, the nuclear explosive is deliberately emplaced and detonated beneath the water table. As a result, if adequate permeability exists, the chimney 13 is flooded by the natural inflow of water under the hydrostatic head of its vertical displacement below the water table 12. Otherwise, water may be introduced to provide a similar situation. The broken ore in the chimney is thus subjected to hydrostatic pressures which are dependent upon the prevailing water head. In this regard, the hydrostatic pressure acting on a given point is approximately 435 psi or 30 bars for each 1,000 ft it is below the water table.

The hydrostatic pressure acting on the nuclear chimney 13 is utilized to good advantage to promote leaching of the broken ore contained therein. More particularly, the chimney 13 is employed as an in situ pressure vessel for accelerating the dissolution of the contained broken primary ore minerals. In this regard, an oxidizing gas is introduced into lower portions of the chimney at high pressure and thereby percolates through the contained broken ore and water mixture which has a substantially infinite permeability compared to that of the surrounding unbroken wall rock. By virtue of the high pressure, the solubility of the gas is increased such that it readily dissolves and more rapidly oxidizes the ore minerals particularly sulfides to form an acid leach solution as a result of the reaction. The acid solution aids the oxidation of the ore minerals by the gas and the desired ore element goes into solution at a relatively rapid rate.

For purposes of the present invention, introduction of the oxidizing gas is continued until a concentration of the desired mineral component, e.g., copper, suitable for recovery is achieved in the leach solution. Thenceforth the desired material is recovered from the pregnant leach utilizing a solvent extraction or liquid ion exchange solution as described hereinafter.

The foregoing leaching operation of the process is preferably accomplished by drilling at least one shaft 14 which is provided with a casing to communicate with the bottom of the chimney 13 and at least one shaft 16 to communicate with top portions thereof. Often times a void space of considerable volume is formed in the upper portion of the chimney (not shown) in which event shaft 16 communicates with the void space. The oxidizing gas is then introduced to the bottom of the chimney via cased shaft (or well bore) 14, as by means of a pipe 17 extending therethrough in spaced relation to the shaft wall and connected at its upper end to a suitable compressed gas source 18, such as a gas supply and compressor, at the ground surface. The gas thus rises upward through the chimney to the top portion or void space and any excess not reacting will rise to the ground surface through the shaft 16. In the event that oxygen is being employed as the oxidizing gas any excess rising to the surface may of course be recycled. If air is being employed the residual gas which would mainly be nitrogen may be discarded. The rate of reaction and attendant leaching of the desired value from the ore is significantly accelerated at elevated temperatures as well as by the increased oxygen pressure provided as discussed above. Some increase in temperature is provided by the normal geothermal gradient. The energy of the detonation provides a relatively small increase in temperature and oxidation of the sulfides also provides heat to increase the temperature of the leach solution and chimney rubble; however, where total sulfide content is low this effect may not be adequate to provide an effective temperature increase. Where leach solution is processed at the surface it may be heated and recirculated to heat the chimney contents; however, such a procedure is not particularly suitable in the present process. Accordingly, it is preferred herein to introduce the additional heat which may be required by injecting steam or superheated steam through pipe 17 as from a surface steam plant 19. Mixtures of steam and oxidizing gas may, of course, be injected simultaneously if desired. Chimney content temperatures somewhat above 100° C with oxygen pressures above several hundred psi, e.g., above 500 psi are considered advantageous. (c.f. "Chemical Mining of Primary Copper Ores," A. E. Lewis, pp. 909–917, Proceedings of Symposium on Engineering with Nuclear Explosives, held January 14–16, 1970 at Las Vegas, Nevada). The maximum temperature will usually be determined by the thermal stability of the extractant but may be at least as high as 200° C or more. It may be noted that control of the chimney temperature can be achieved by regulating the rate of oxidizing gas and/or rate of steam injection. Also, as the solvent extraction procedure provides an increase in the acid content of the aqueous phase and concentration of the extracted value is decreased the rate of leaching may be accelerated.

The leaching operation outlined hereinbefore is particularly applicable to the economic recovery of copper from deep deposits of primary copper sulfides, such as chalcopyrite ($CuFeS_2$). In this case, oxygen is employed as the oxidizing gas introduced to the chimney containing broken ore and water at least in initial phase of the operation. Other suitable oxidizing agents are also operable. Various other materials may also be contained therein such as iron sulfate in varying proportions together with trace amounts of silver, gold, molybdenum, etc. To provide conditions suitable for recovery of the copper as described hereinafter the pH (acidity) of the leach solution should preferably be of the order of 1.0 – 3. The LIX-64 type extractant is operable with about zero to several grams, i.e., 10 grams/liter of $H_2SO_4$. Leaching in the initial period is continued until a sufficient content of copper is leached to afford economic recovery. Such a content may range from at least about 1 gram per liter to 20 or more grams per liter in the loaded leach solution.

For recovering the metal value, e.g., copper from the loaded leach solution, in accordance with the present invention, a suitable extractant phase, i.e., a solvent extraction or liquid ion exchange phase as such phases may variously be known, is bubbled through the pregnant leach solution in the nuclear cavity and which is then drawn to the surface for recovery of the desired value. More particularly, an organic extractant solution or phase may be injected from a solution processing plant 21 situated at the surface as through the clearance space between the casing of shaft 14 and pipe 17 into the lower portion of the chimney vessel. The extractant is dispersed thereat and being of a lower density than the loaded leach solution, rises with significant turbulence and along circuitous paths through the fragmented ore to contact the leach solution so as to extract the desired value, i.e., copper therefrom. The loaded extractant phase eventually collects in the upper portion of the chimney to a depth at which the lower end of the casing of shaft 16 is immersed therein. As this operation is initiated some of the leach solution may be displaced upwardly through shaft 16 and may be treated in plant 21 for the recovery of copper therein, if of sufficient economic value, by conventional cementation, extraction, ion exchange, or other procedure.

Thereafter, loaded extractant phase may be withdrawn through shaft 16 as by means of a pump 22 and fed into the solution processing plant for recovery of the mineral value (copper).

It may be desirable in order to increase extraction efficiency to increase the interface area, contact time and dispersal of the extractant in some manner to assure adequate contact with all portions of the pregnant leach solution over an appropriate period of time. This can be accomplished in several ways. However, it may be noted that the rising current of extractant tends to cause some circulation of the leach solution as would convection currents caused by heating effects of injected steam. Also, injected oxidizing gas or injection of air or nitrogen simultaneously with the extractant phase can also assist in dispersing the extractant phase and circulating the leach solution to improve interphase contact. Also, the lower end of the casing of shaft 14 may be perforated over a length extending across the bottom of the cavity (not shown) so as to disperse the oxidizing gas and/or extractant phase more effectively.

The solvent extraction medium or phase is generally comprised of a fluid organic solvent containing an extraction agent, of which several are known in the art. The organic solvent may be a hydrocarbon in which the extractant agent and extracted species are soluble. Low cost petroleum fractions having a relatively high boiling point to reduce volatility are generally suitable and are preferred on an economic basis.

Kerosene, diesel fuel, stove oils, fuel oils and the like having a low content of lower boiling materials may be used. High gravity relatively low viscosity crude oils from which the lower boiling fractions have been removed could also be used as an economical solvent.

LIX-64, a product of the General Mills Corporation, is an extraction agent which is selective with regards to extraction of copper from leach solutions of the character described. This reagent is an α-hydroxyoxime for which the general formula is RR''C(OH)CR'NOH where R,R' and R'' may be any of a variety of organic hydrocarbon radicals such as aliphatic and alkyaryl radicals. These extractants and the copper complexes have a solubility of at least about 2% by weight in a solvent such as kerosene and are insoluble in water (c.f. page 254, Supplement Volume (1971), "Encyclopedia" cited above. Also D. W. Agers et al., Trans. Soc. Mining Engrs. 235, 191–198 (1966) Kelex-100.) LIX-64N is an improved extractant from the same source. Kelex-100 type reagent from Ashland Chemical Company may be used similarly. This reagent operates best in a pH range of about 1.5 to 2.8; however, extraction still occurs at a pH of about 0.5 (c.f. Hartlage, 1. A., Kelex-100 - "A New Reagent for Copper Solvent Extraction," SME Fall Meeting, Salt Lake City, Utah, September, 1969). Such reagents in amounts of about 0.5 to 7% or more determined by solubility by weight may be used with acidity conditions disclosed hereinbefore to effectively and preferentially extract copper from the aqueous leach liquor yielding the loaded extractant solution.

For recovering the copper from the loaded extractant solution the surface processing plant which may be of a modified conventional design may include copper value stripping circuits which yields a sulfuric acid solution suitable for processing in an electrolytic circuit. The copper anodes produced therein are of relatively high purity. More particularly, such plant may include at least a pair of tandem mixer-settler stripper units wherein the copper is stripped from the pregnant extractant phase using an aqueous sulfuric acid containing about 100 to about 200 grams/liter of $H_2SO_4$. The copper loading of the stripper solution may range from about 2 to as high as 50 grams per liter depending on operating conditions. The stripper solution is then treated in an electrowinning circuit and is recycled to the mixer settler circuit. Conventional solution processing plants are discussed in "World Mining," October, 1970, pages 38–44 and in references cited therein. An accessary circuit corresponding to the leach liquor treating circuit of such a plant may, of course, be used to treat any overflow aqueous leach liquor, if desired. The depleted extractant phase may then be refurbished and recycled into the chimney.

Further details of the process of the invention will be set forth in the following illustrative example:

EXAMPLE

Consider the case of a deep deposit having an ore grade of 0.5% copper, bulking factor of 0.15, and rock density of 2.7 g/cc in an area where the water table is at 50 meters. The lower limit of copper content which may be treated can be considerably lower while higher contents can even more readily be treated. From well established nuclear explosive technology, it can be shown that a nuclear explosive with a yield of 100 $kt$ emplaced and detonated in the ore deposit at a burial depth of 750 meters is productive of a cavity or nuclear chimney with a radius of about 41 meter and volume of $2.9 \times 10^5$ cubic meters. Assuming a chimney wall slope of 3° from the vertical, it can be calculated that the chimney has a height of 250 meters above the shot point and contains $1.6 \times 10^6$ cubic meters of broken ore. The total void space may be about 25 to 50%. With the chimney thus positioned and proportioned, the hydrostatic pressure acting thereon when filled varies from 1,000 psi at the bottom of the chimney to 650 psi at the top. Steam is generally injected together with oxygen at a pressure of about 1,000 psi which is introduced to the chimney at a rate of 5,000 ft$^3$/hr for a time sufficient to provide a concentration of at least about 0.5 g/liter in the pH of the order of 1.5 to 04.0 therein. An organic extractant phase comprising a high boiling petroleum hydrocarbon solvent with about 2 percent of LIX-64 or LIX-64N dissolved therein may then be injected with a flow rate, e.g., 5,000 gals/min to extract copper from the leach liquor, in situ, in the nuclear chimney. Thereafter the extraction and oxidizing treatments may be alternated dependent on copper content of the leach liquor and to regulate chimney temperature. In general, the oxidizing agents and extractant are not introduced simultaneously when oxidation of the solvent or explosive mixtures may be produced. Copper contents of the extractant phase may range from about 2 to 10 grams or higher/liter under varying conditions in the chimney. The loaded extractant phase is then circulated to a surface plant and is passed through at least two mixer-settler units to contact a sulfuric acid stripping solution containing about 100 to 200 grams/liter of $H_2SO_4$ yielding an aqueous copper sulfate $H_2SO_4$ solution which is treated in an electrowinning plant. Following makeup of the organic extractant phase it is recirculated as above.

It is considered that a similar in situ pressure leaching procedure can liberate other metal values from a sulfide ore deposit and that an organic extractant solution of appropriate character may be used to strip desired values therefrom by manipulation similar to those set forth above. For example, amine extractants, alkyl phosphate extractants and others are known to be effective for extracting various metal values from acid leach liquors.

Although the invention has been hereinbefore described and illustrated in the accompanying drawing with respect to specific steps of the method thereof, it will be appreciated that various modifications and changes may be made therein without departing from the true spirit and scope of the invention, and thus it is not intended to limit the invention except by the terms of the following claims.

What I claim is

1. A leaching solvent extraction method for the recovery of a desired mineral value from a primary sulfide ore deposit containing same comprising the steps of:

locating a primary ore deposit containing a desired element existing beneath a water bearing subterranean formation;

creating a subterranean chamber containing said primary sulfide ore in a fragmented form at a substantial depth beneath the upper level of said water bearing formation so that the contents thereof are subjected to the hydrostatic pressure head of said water bearing formation;

introducing oxidizing gas to said chimney at substantially the pressure of said hydrostatic head with said gas being therefore more highly soluble in the water contained in said chimney to oxidize said ore to form an acid leach solution effective in the presence of the dissolved gas to dissolve said ore and cause said desired element to go into solution therein;

then contacting said leach solution in the chamber with an organic extractant phase to extract the desired mineral value therein yielding a loaded extract phase; and circulating said loaded extract phase to the surface and stripping the desired mineral value from the loaded extract phase.

2. A leaching-solvent extraction method as defined in claim 1 wherein said chamber is created by emplacing and detonating a nuclear explosive in said primary ore deposit.

3. A leaching-solvent extraction method according to claim 2 wherein steam is injected along with said oxidizing gas to heat the chimney contents and accelerate oxidation and dissolution of said ore.

4. A leaching-solvent extraction method according to claim 3, further defined by said desired element being copper, said ore being primary copper sulfides, and said gas being oxygen.

5. A leaching-solvent extraction method according to claim 4, wherein the oxidizing gas and steam are injected into said chimney until a predetermined concentration of said copper is attained in the leach liquor prior to extraction of said copper therefrom.

6. A leaching-solvent extraction method according to claim 5 wherein the ore is oxidized with heating until the pH of the leach solution is in the range of about 0.5 to about 4.0 and said extractant phase comprises an organic solvent together with an α-hydroxyoxime dissolved therein and wherein the copper is stripped from the loaded extract using an aqueous phase containing about 100 to 200 gram/liter of $H_2SO_4$.

7. A leaching-solvent extraction method according to claim 6 wherein the pH of the leach solution is in the range of about 1.5 to 2.8.

8. A leaching-solvent extraction method according to claim 7, wherein the copper content of the leach liquor is at least 0.5 gram/liter prior to initiation of extraction of the copper therefrom.

9. A leaching-solvent extraction method according to claim 6, wherein the introduction of oxidizing gas and extractant phase to said chimney is effected by drilling at least one first shaft to communicate with the bottom of said chimney, and delivering said gas and extractant phase to the bottom of said chimney via each first shaft wherein the removal of the loaded extract phase from said chimney is effected by drilling at least one second shaft to communicate with the top portions of said chimney, and pumping said loaded extract phase from said chimney to the ground surface via each second shaft.

* * * * *